(12) United States Patent
Hu et al.

(10) Patent No.: US 10,545,260 B2
(45) Date of Patent: Jan. 28, 2020

(54) UPDATING GEOLOGICAL FACIES MODELS USING THE ENSEMBLE KALMAN FILTER

(75) Inventors: Lin Ying Hu, Katy, TX (US); Yong Zhao, Katy, TX (US); Yongshe Liu, Katy, TX (US)

(73) Assignee: Conocophillips Company, Houston, TX (US)

(*) Notice: Subject to any disclaimer, the term of this patent is extended or adjusted under 35 U.S.C. 154(b) by 1384 days.

(21) Appl. No.: 13/422,070

(22) Filed: Mar. 16, 2012

(65) Prior Publication Data

US 2012/0265512 A1    Oct. 18, 2012

Related U.S. Application Data

(60) Provisional application No. 61/475,899, filed on Apr. 15, 2011.

(51) Int. Cl.
*G01V 99/00*    (2009.01)

(52) U.S. Cl.
CPC .................. *G01V 99/005* (2013.01)

(58) Field of Classification Search
None
See application file for complete search history.

(56) References Cited

U.S. PATENT DOCUMENTS

| | | |
|---|---|---|
| 4,637,002 A | 1/1987 | Sallas |
| 5,886,255 A | 3/1999 | Aronstam |
| 6,292,758 B1 | 9/2001 | Gilbert et al. |
| 6,473,696 B1 | 10/2002 | Onyia et al. |
| 7,536,262 B2 | 5/2009 | Hornbostel et al. |
| 7,584,081 B2 | 9/2009 | Wen et al. |
| 7,657,413 B2 | 2/2010 | Le Ravalec-Dupin et al. |
| 7,657,494 B2 | 2/2010 | Wilkinson et al. |
| 8,838,425 B2* | 9/2014 | Zhang et al. .................. 703/10 |
| 2007/0118346 A1 | 5/2007 | Wen et al. |

(Continued)

OTHER PUBLICATIONS

Wen et al. "Some Practical Issues on Real-Time Resrvoir Model Updating Using Ensemble Kalman Filter", 2005, Iinternational Petroleum Technology Conference, IPTC 11024,14 pages.*

(Continued)

*Primary Examiner* — Suzanne Lo
(74) *Attorney, Agent, or Firm* — Conocophillips Company

(57) ABSTRACT

The invention relates to a method for history matching a facies geostatistical model using the ensemble Kalman filter (EnKF) technique. The EnKF is not normally appropriate for discontinuous facies models such as multiple point simulation (MPS). In the method of the invention, an ensemble of realizations are generated and then uniform vectors on which those realizations are based are transformed to Gaussian vectors before applying the EnKF to the Gaussian vectors directly. The updated Gaussian vectors are then transformed back to uniform vectors which are used to update the realizations. The uniform vectors may be vectors on which the realizations are based directly; alternatively each realization may be based on a plurality of uniform vectors linearly combined with combination coefficients. In this case each realization is associated with a uniform vector made up from the combination coefficients, and the combination coefficient vector is then transformed to Gaussian and updated using EnKF.

11 Claims, 3 Drawing Sheets

(56) References Cited

U.S. PATENT DOCUMENTS

2008/0133192 A1    6/2008    Gallagher et al.

OTHER PUBLICATIONS

Almendral-Vazquez and Syversveen, "The Ensemble Kalman Filter—theory and applications in oil industry," Norsk Regnesentral (Norwegian Computing Center, NR) (2006).
Arroyo-Negrete, et al., "Streamline Assisted Ensemble Kalman Filter for Rapid and Continuous Reservoir Model Updating," SPE 104255, International Oil & Gas Conference and Exhibition in China, Dec. 5-7, 2006, Beijing, China (2006).
Evensen, et al., "Using the EnKF for assisted history matching of a North Sea reservoir model," Houston, TX, Soc. Petroleum Eng., Inc., SPE 106184, (2007).
Evensen, "The Ensemble Kalman Filter for Combined State and Parameter Estimation," IEEE Control Systems Magazine, 83-104 (2009).
Liu and Oliver, "Critical evaluation of the ensemble Kalman filter on history matching of geological facies," SPE92867, SPE 2005 SPE Reservoir Simulation Symposium, Houston TX, (2005).
Lyster, "A Second Generation Gibbs Sampler for Simulation with Multiple-Point Statistics" Geophysics, 60 (1995).
Moradkhani, et al., "Dual state-parameter estimation of hydrological models using ensemble Kalman filter,".
Naevdal, et al., "Reservoir monitoring and continuous model updating using ensemble Kalman filter," SPE, p. 84372. (2003).
Wen and Chen, "Some Practical Issues on Real-Time Reservoir Model Updating Using Ensemble Kalman Filter," IPTC 11024.

\* cited by examiner

UPDATING GEOLOGICAL FACIES MODELS USING THE ENSEMBLE KALMAN FILTER

CROSS-REFERENCE TO RELATED APPLICATIONS

This application is a non-provisional application which claims the benefit of and priority to U.S. provisional application Ser. No. 61/475,899 dated Apr. 15, 2011, entitled "Updating Geological Facies Models Using the Ensemble Kalman Filter," which is hereby incorporated by reference in its entirety.

FIELD OF THE INVENTION

The present disclosure relates generally to methods for updating geostatistical hydrocarbon reservoir models by assimilating production data—a process commonly known as history matching—using the ensemble Kalman filter.

BACKGROUND OF THE INVENTION

Subsurface geological modeling involves estimating parameters of interest in a 3-d model which is used for development planning and production forecasting. The modeling is a crucial part of the process of extraction of oil and gas from underground reservoirs. It is used, for example, initially to assess the viability of an underground reservoir for production and locate the sites for wells. It is also used to inform decisions about the rate of extraction of oil or gas which, if too rapid, can cause major technical problems. Decisions about the siting of future wells, after production has started, will also be informed by geomodelling.

A geological reservoir model should, as far as possible, be in conformity with the geological rules or features that are specific to the depositional environment of the reservoir of interest. The geomodel also, as far as possible, needs to be conditioned to all quantitative information from well cores and logs, seismic attributes, well tests and production history, etc. Thirdly, because of our incomplete knowledge about the subsurface reservoir, there is always a degree of uncertainty that needs to be accounted for in the reservoir modeling process.

In this context, several geostatistical or probabilistic methods have been developed for geological reservoir modeling. These methods allow the building of models that are representative of various depositional environments, with various types of data being integrated into the models. In addition, the nature of the probabilistic approach makes it possible to account for uncertainty.

Once a geostatistical reservoir model is chosen to describe the reservoir of interest, one can generate, potentially, an infinite number of so-called realizations. Each realization consists of a matrix comprising several values (representing parameters such as porosity and permeability) associated with each of a large number of cells distributed over the volume of the reservoir. Only for a relatively small number of these cells will the values be known with relative certainty (namely those cells which contain parameters which have been measured). For the remaining cells, the values are estimates based on the geostatistical modeling process. Each realization will have a different set of estimated values, each realization having been generated using a different, but equally valid, random seed.

The model is used to make predictions of e.g. flow rates and pressures in wells; these are sometimes known as the "dynamic responses" predicted by the model. Data (e.g. flow rate data) will be gathered from the wells over time once the reservoir is in production and, generally, these will differ from the predicted values generated by the model. History matching is a process by which new realizations of the model are generated which predict the correct current values for e.g. flow rate and pressure, and can therefore be assumed to be more accurate and to make more accurate predictions of these values for the future. In any history matching process creating updated realizations, a good goal is to preserve the geological features and statistical data on which the model is based.

In one history matching technique, an initial realization is modified so that the simulated (or predicted) dynamic responses are a better match with the measured ones. This procedure may be repeated independently for each of a number of initial realizations to build an averaged history matched realization. As mentioned above, for any modification, it is helpful if the statistical data and geological features inherent in the model are preserved.

In another history matching technique, the Ensemble Kalman filter (EnKF) is used for assimilating dynamic data. In the EnKF method, a series or "ensemble" of initial realizations is used, and they are simultaneously updated to dynamic data. This technique is normally applicable to continuous, Gaussian models.

The starting point for the EnKF process is a matrix comprising the ensemble of initial realizations. The dynamic response is computed for each initial realization, for a first time interval. The dynamic response could be as simple as a single flow rate number for each realization. However, it would more normally be a flow rate value and other data such as pressure and/or saturation, for each of a number of wells in the reservoir.

Once this calculation has been performed, a correlation matrix is constructed. This matrix contains the correlation coefficients between the dynamic responses and between the model parameters and dynamic responses. The data in the correlation matrix is sample covariance data which can be derived because a number of realizations are used instead of one.

The numbers of rows and columns of this matrix are respectively the number of dynamic responses and the sum of the number of model parameters and the number of dynamic responses. This is a large matrix and it takes a lot of computer resource for its construction, although it is nonetheless feasible on a current personal computer.

The next step is to combine the correlation matrix with the actual measured dynamic data from the reservoir over the first time interval, to produce an ensemble of updated realizations.

The process is iterated for the next time interval. Similarly, as new dynamic data from the reservoir become available, the EnKF process is applied again, starting with the latest updated ensemble of realizations from the most recent iteration of the EnKF process.

The details of the EnKF process itself are not the subject of the invention described in this patent application. However, a good explanation and overview of the EnKF process as it is applied in the present invention may be found in a helpful review paper, Aanonsen S I et al.: "The Ensemble Kalman Filter in Reservoir Engineering—A Review", *SPE Journal* 14(3) (September 2009) 393-412. This paper is incorporated herein by reference.

A limitation of the EnKF method is that, strictly speaking, it applies only to continuous model parameters, and in particular to Gaussian parameters. It is efficient only if there is a linear statistical relationship between the flow response and the model parameters. Where the model is complex and discontinuous, the EnKF becomes less efficient. The limitations of the EnKF are discussed in the Aanonsen paper mentioned above (see, in particular, page 23 et seq.).

In practice, a facies model which is not continuous is often used. For some applications, a so-called truncated Gaussian model can be used to represent reservoirs with facies. In this model, the values of continuous Gaussian realizations are classified into intervals that represent facies so, for example, one facies may be represented by values between 1 and 2 in a realization and another facies represented by values between 0 and 1. It is possible to apply the EnKF on the continuous Gaussian realizations to perform history matching in such a discontinuous model.

For some complex facies structures, however, the truncated Gaussian model becomes unusable. Especially difficult are fluvial channel reservoirs which have very complex geological features. For reservoirs such as this, a different type of model is needed which represents facies in a different way. One such model is multiple point simulation ("MPS"). In MPS, the model is a function of the available facies data, a uniform random field and also a so-called training image, which is a conceptual representation of the facies geometry of the reservoir to be modelled.

The EnKF cannot be applied directly to an MPS model because it is discontinuous. Attempts have been made to overcome this problem. The so called "level set" and "discrete cosine transformation" methods seek to apply EnKF to MPS models. These methods are described in the Aanonsen S I et al paper referred to above. However, there is no mathematical proof that these techniques preserve the statistical data and geological features inherent in the model.

BRIEF SUMMARY OF THE DISCLOSURE

The inventors have devised a technique for applying EnKF to an MPS model which is highly discontinuous and uses uniform random vectors. It involves creating an initial ensemble of realizations, and applying the EnKF to an ensemble of Gaussian transformed random vectors.

In one embodiment, an initial ensemble of realizations in an MPS model may be based directly on an ensemble of respective uniform vectors. The ensemble of corresponding Gaussian vectors may be derived using a Gaussian score transform.

Simulated dynamic responses may be calculated for each realization. A correlation matrix is constructed containing correlation coefficients between the Gaussian vectors and the dynamic responses, and between the dynamic responses themselves. The correlation matrix thus contains information about the statistical relationship between the Gaussian values and the dynamic data, and also between the dynamic data themselves.

Based on this correlation matrix, the real dynamic data may then be used in an EnKF process to update the ensemble of Gaussian vectors. The ensemble of updated Gaussian vectors may then be transformed back to an ensemble of uniform vectors using the uniform score transformation. From these updated uniform vectors, updated realizations may be derived. As before, the process is an iterative one; the updated ensemble of Gaussian vectors may then be further updated with dynamic data from the next time interval.

This technique does, however, involve updating all components of the Gaussian vectors, and thus may not be efficient for very large vectors.

In co-pending U.S. provisional patent application No. 61/405,062 a parameterization method is described which is of particular value for models such as MPS models which incorporate a training image and are based on uniform random vectors. In the method described in this patent application a number of uniform vectors are created and linearly combined together with combination coefficients. The resulting non-uniform field is then subjected to a uniform score transformation to transform it into a modified uniform field which is then used to derive a realization. This realization is thus a function of the combination coefficients, which may be adjusted at will to produce further realizations, all of which retain the geological and statistical integrity of the model.

A second embodiment involves using this parameterization method in combination with the method described above of applying the EnKF to underlying continuous vectors. In this embodiment, each realization in the initial ensemble of realizations is based on a number of created then fixed uniform vectors which are linearly combined together with respective combination coefficients. Each realization is thus a function of a vector of combination coefficients.

The combination coefficients may, for example, take any value between −2 and 2. Therefore, they can be considered as uniformly distributed between −2 and 2. The starting point for the EnKF process in this embodiment may therefore be an ensemble of combination coefficient vectors. Therefore, the number of parameters to update can be reduced to the number of combination coefficients, and this number can be selected. These uniformly distributed combination coefficients may be subjected to a Gaussian score transform before the EnKF is applied.

A model realization may be calculated for each uniform combination coefficient vector combined with the created then fixed ensemble of uniform vectors. Flow simulation may be performed and the EnKF used to update the Gaussian transformed vectors, with the result being converted back to uniform vectors and the process repeated.

The invention may comprise a method of history matching a facies geostatistical model of a hydrocarbon reservoir based on uniform random vectors such as a multiple point simulation (MPS) geostatistical model of a hydrocarbon reservoir, the method comprising the steps of:
  a) creating an initial ensemble of realizations of the model in which each realization is a function of an initial uniform random vector;
  b) deriving simulated dynamic responses from each realization for a given time period;
  c) performing a Gaussian score transform on each said initial uniform random vector to create a corresponding ensemble of initial Gaussian random vectors;
  d) deriving a correlation matrix correlating said initial Gaussian random vectors and said dynamic responses, and also correlating said dynamic responses themselves; obtaining measured data from said reservoir for said given time period;
  e) using said correlation matrix, applying the ensemble Kalman filter to an ensemble of said initial Gaussian random vectors to update said initial Gaussian random vectors to said measured data, thereby creating updated Gaussian vectors;
  f) computing updated uniform vectors corresponding to said updated Gaussian vectors; and
  g) deriving from said updated uniform vectors an updated ensemble of realizations.

Optionally, each said initial realization may be directly based on each said initial uniform random vector. Alternatively, each said initial realization may be a function of a respective set of further uniform random vectors linearly combined with respective combination coefficients, and wherein each said initial uniform vector is composed of said respective combination coefficients. In this case, said further uniform random vectors may be fixed prior to being combined. The model may include a training image.

Alternatively, the invention may comprise a method of history matching a facies geostatistical model of a hydrocarbon reservoir based on uniform random vectors such as a multiple point simulation (MPS) geostatistical model of a hydrocarbon reservoir, the method comprising the steps of:
  (a) creating an initial ensemble of realizations of the model in which each realization is a function of a plurality of uniform random vectors;
  (b) fixing said uniform random vectors and then linearly combining them with respective combination coefficients;
  (c) each said realization thereby being associated with a uniform vector comprising said respective combination coefficients, whereby an ensemble of uniform combination coefficient vectors is provided;
  (d) deriving simulated dynamic responses from each realization for a given time period;
  (e) performing a Gaussian score transform each said vector of uniform combination coefficients to create a corresponding Gaussian random vector, whereby an ensemble of Gaussian combination coefficient vectors is provided;
  (f) deriving a correlation matrix correlating said Gaussian combination coefficient vectors and said dynamic responses, and also correlating said dynamic responses themselves;
  (g) obtaining measured data from said reservoir for said given time period;
  (h) using said correlation matrix, applying the ensemble Kalman filter to an ensemble of said Gaussian combination coefficient vectors to update said Gaussian combination coefficient vectors to said measured data, thereby creating updated Gaussian vectors;
  (i) computing updated uniform vectors corresponding to said updated Gaussian vectors; and
  (j) deriving from said updated uniform vectors an updated ensemble of realizations.

BRIEF DESCRIPTION OF THE DRAWINGS

A more complete understanding of the present invention and benefits thereof may be acquired by referring to the follow description taken in conjunction with the accompanying drawings, in which.

DETAILED DESCRIPTION

Figure 1:
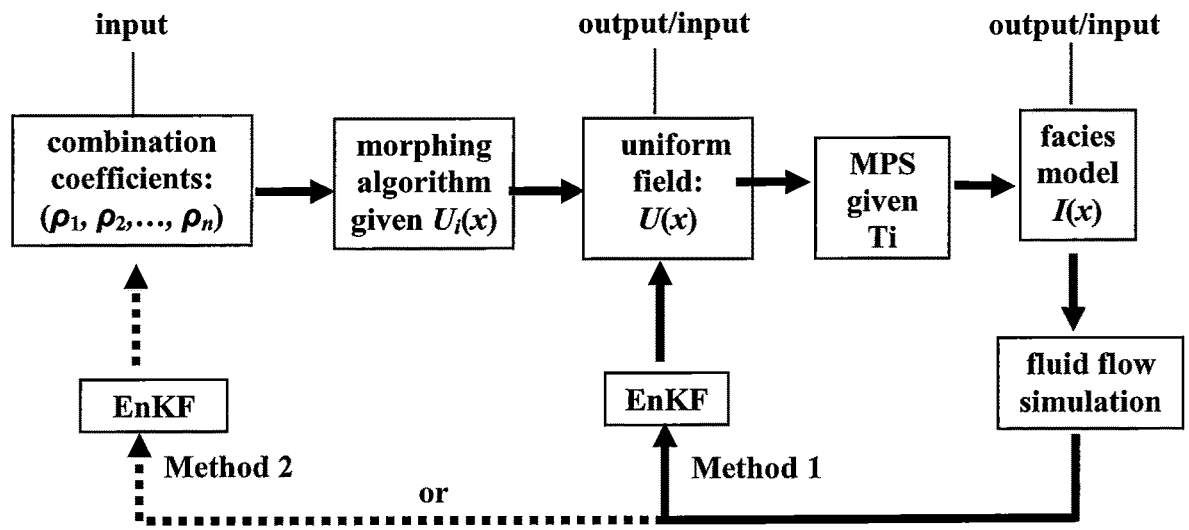
FIG. 1, is a schematic representing two workflows, using Example 1 and Example 2, for updating a geological model built by MPS using EnKF.

The following examples of certain embodiments of the invention are given. Each example is provided by way of explanation of the invention, one of many embodiments of the invention, and the following examples should not be read to limit, or define, the scope of the invention.

Example 1

Consider first using the EnKF approach to update a uniform vector directly. The procedure is as follows:

Initiation:
1. Set t=0 for the initial time step;
2. Generate an initial ensemble of n uniform vectors: $U_i^t$, i=1, 2, . . . , n;
3. For all uniform vectors $U_i^t$, compute their corresponding standard Gaussian vectors using the inverse standard Gaussian cumulative distribution function (Gaussian score transformation):

$Y_i^t = G^{-1}(U_i^t), i=1,2,\ldots,n;$

Iteration:
4. Build the reservoir model $m_i^t$ for each $U_i^t$ by the predefined geostatistical simulation procedure (e.g. MPS) with $U_i^t$ as input and $m_i^t$ as output;
5. Perform flow simulation for each $m_i^t$ between time steps 0 and t+1;
6. Update the ensemble of Gaussian vectors $\{Y_i^t, i=1, 2, \ldots, n\}$ using EnKF from time step t to time step t+1: $\{Y_i^{t+1}, i=1, 2, \ldots, n\}$;
7. For all the updated Gaussian vectors $Y_i^{t+1}$, compute their corresponding uniform vectors (uniform score transformation):

$$U_i^{t+1} = G\left(\frac{Y_i^{t+1}}{\sigma_i^{t+1}}\right), i = 1, 2, \ldots, n;$$

8. Set t=t+1; go to 4 until the last time step.

At each time step of the sequential updating procedure, only the geomodel realizations are updated by EnKF; their corresponding pressure and saturation fields are obtained by performing fluid flow simulations from the initial time step t=0. This avoids the inconsistency between the updated geomodel realizations and their corresponding flow responses, but obviously requires much more flow simulation effort.

It can be shown that a realization updated by EnKF is a linear combination of the initial Gaussian vectors and thus remains Gaussian. However, the sum of the squares of these combination coefficients does not necessarily equal 1. This means that the updated realization is no longer standard Gaussian.

Note that $\sigma_i^{t+1}$ stands for the (empirical) standard deviation of the Gaussian vector $Y_i^{t+1}$.

Example 2

Consider now using the EnKF approach to update the combination coefficients of a set of uniform vectors. This method involves a relatively small number of parameters (combination coefficients), in comparison with the number of grid nodes of the geomodel. The procedure is as follows:

Initiation:
1. Generate n uniform vectors: $U_i$, i=1, 2, ..., n;
2. Set t=0 for the initial time step;
3. Generate an initial ensemble of k uniform vectors $\rho_{l,1}^t = (\rho_{l,1}^t, \rho_{l,2}^t, \ldots, \rho_{l,n}^t$; l=1, 2, ..., k; all components of these vectors are uniform numbers between −2 and 2;
4. For all vectors $\rho_l^t$, compute their corresponding standard Gaussian vectors:

$$Y_l^t = (Y_{l,1}^t, Y_{l,2}^t, \ldots, Y_{l,n}^t), l=1,2,\ldots,k, \text{ with } Y_{l,i}^t = G^{-1}(0.5+0.25\rho_{l,i}^t), i=1,2,\ldots,n;$$

Iteration:
5. For each vector of combination coefficients $\rho_l^t = (\rho_{l,1}^t, \rho_{l,2}^t, \ldots, \rho_{l,n}^t)$, perform the linear combination:

$$\sum_{i=1}^{n} tg\left(\frac{\pi \rho_{l,i}^t}{4}\right) U_i,$$

then compute its corresponding uniform vector $U_l^t$ by the uniform score transformation;
6. Build the reservoir model $m_l^t$ for each $U_l^t$ by the pre-defined geostatistical simulation procedure with $U_l^t$ as input and $m_l^t$ as output;
7. Perform flow simulation for each $m_l^t$ between time steps 0 and t+1;
8. Update the ensemble of Gaussian vectors $\{Y_l^t, l=1, 2, \ldots, k\}$ using EnKF from time step t to time step t+1: $\{Y_l^{t+1}, l=1, 2, \ldots, k\}$;
9. For all the updated Gaussian vectors $Y_l^{t+1}$, compute corresponding uniform vectors between −2 and 2: $\rho_{l,1}^{t+1}, \rho_{l,2}^{t+1}, \ldots, \rho_{l,n}^{t+1}$) with $\rho_{l,i}^{t+1} = 4G(Y_{l,i}^{t+1})-2$; i=1, 2, ..., n.

As with Example 1, only the geomodel realizations are updated by EnKF; their corresponding pressure and saturation fields are obtained by performing fluid flow simulations from the initial time step t=0. Likewise, each updated vector $Y_l^{t+1} = (Y_{l,1}^{t+1}, Y_{l,2}^{t+1}, \ldots, Y_{l,n}^{t+1})$ remains Gaussian but not necessarily standard Gaussian (its variance may differ from 1) We may also standardize the Gaussian vector) $Y_l^{t+1} = (Y_{l,1}^{t+1}, Y_{l,2}^{t+1}, \ldots, Y_{l,n}^{t+1})$ at step 9.

Example 3

Figure 2:
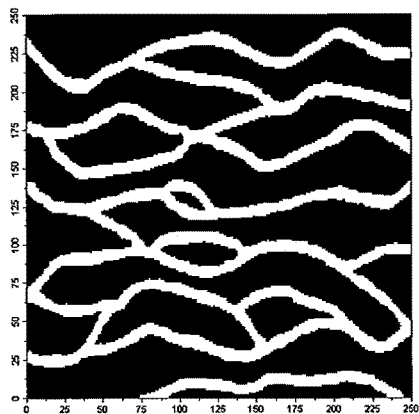
FIG. 2 is a training image, used to create the model of Example 3.

A small scale (50×50) test model was created with multiple point simulation using the freely avaialble SNESIM software from Stanford University. The model was based on a training image (250×250) which is typical of a facies channel reservoir (see FIG. 2) and the parameters for the model were in typical ranges.

Figure 3:
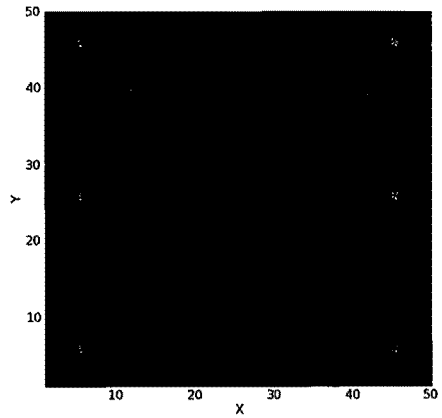
FIG. 3 is a graphic representation of a target realization of an MPS model.

A first random realization was generated which, for the purposes of the test, was considered to represent a real reservoir. This realization is called the target realization and the objective of the test was to demonstrate that the method according to the invention can be used to assimilate simulated dynamic data from the target realization in a history matching process. The target realization is represented in FIG. 3.

Figure 4A:
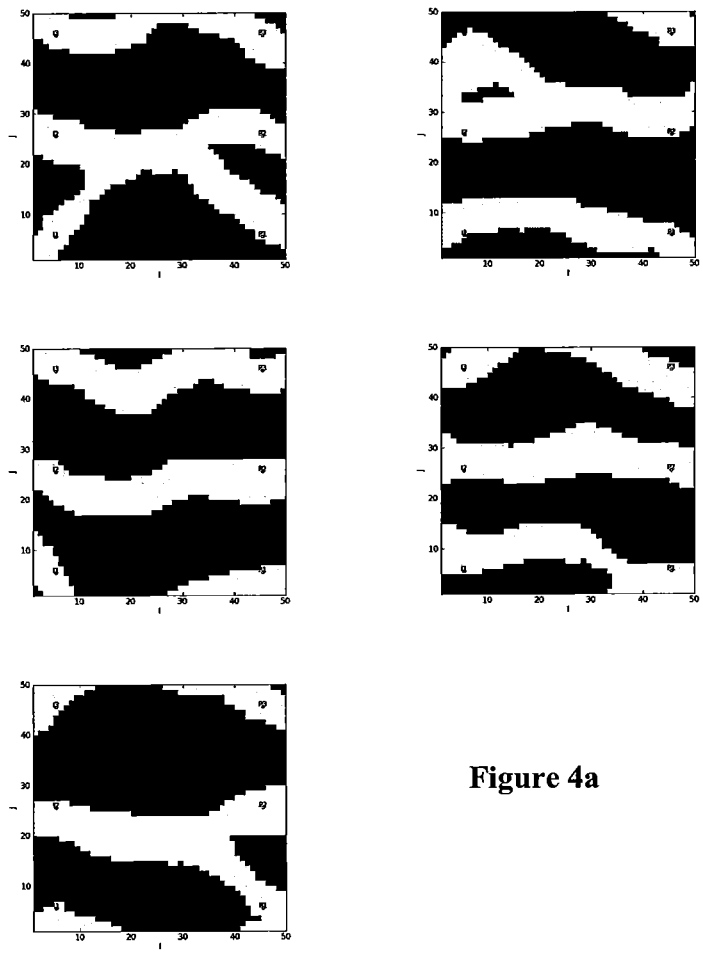
FIG. 4*a* is a graphic representation of five initial realizations.
Figure 4B:
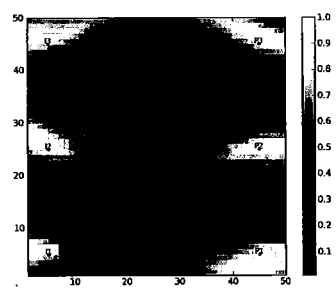
FIG. 4*b* is a graphic representation of a channel probability map based on initial realizations.

An ensemble of 100 initial random realizations, each based on the model, was then generated. Five of these are represented in FIG. 4a, together with a so called channel probability map (FIG. 4b), which is a graphic representation of the probability of finding facies in a particular location and is in essence an average of the 100 initial realizations.

Using the technique described in Example 1 above, the Ensemble Kalman filter was applied to assimilate dynamic data from the target to update the initial ensemble.

Figure 5A:
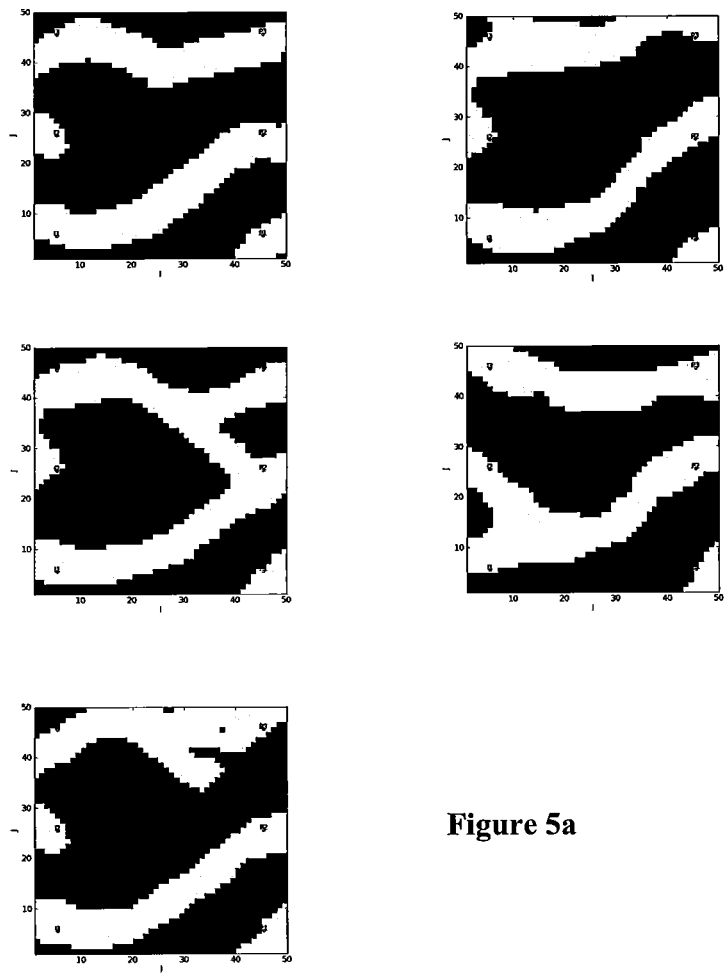
FIG. 5*a* is a graphic representation of five updated realizations.
Figure 5B:
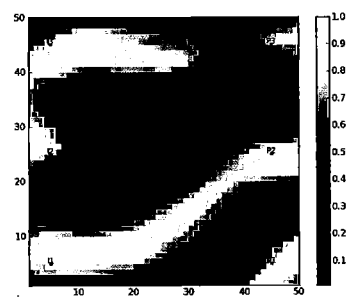
FIG. 5*b* is a graphic representation of a channel probability map based on updated realizations.

An ensemble of 100 updated realizations was produced, and five of these are shown graphically in FIG. 5a. In addition a channel probability map (FIG. 5b) based on the updated ensemble is shown. It may easily be seen that the updated probability map is much more similar to the target than is the probability map of FIG. 4.

In closing, it should be noted that the discussion of any reference is not an admission that it is prior art to the present invention, especially any reference that may have a publication date after the priority date of this application. At the same time, each and every claim below is hereby incorporated into this detailed description or specification as a additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

All of the references cited herein are expressly incorporated by reference. The discussion of any reference is not an admission that it is prior art to the present invention, especially any reference that may have a publication data after the priority date of this application.

The invention claimed is:

1. A computer-based method of history matching a facies geostatistical model of a hydrocarbon reservoir, the method comprising:
creating an ensemble of initial realizations of a facies geostatistical model in which each one of the initial realizations is a function of at least one of a plurality of initial uniform random vectors, the model being a discontinuous multipoint simulation model;
deriving simulated dynamic responses from each initial realization of the ensemble of initial realizations for a given time period;
performing a Gaussian score transform on each initial uniform random vector to create an ensemble of initial Gaussian random vectors;
deriving a correlation matrix correlating each one of the initial Gaussian random vectors and the simulated dynamic responses, and correlating the simulated dynamic responses with each other;
obtaining measured data from a reservoir for the given time period;
using the correlation matrix, applying ensemble Kalman filter, using a computing processor, to the ensemble of initial Gaussian random vectors to update the ensemble of initial Gaussian random vectors to the measured data, thereby creating updated Gaussian vectors;
computing updated uniform vectors corresponding to the updated Gaussian vectors;
deriving from the updated uniform vectors an ensemble of updated realizations; and
generating a channel probability map based on the ensemble of updated realizations, wherein,
the method preserves statistical data and geological features of the model.

2. The method of claim 1, wherein each one of the initial realizations is directly based on one of the initial uniform random vectors.

3. The method of claim 1, wherein each one of the initial realizations is a function of a plurality of further uniform random vectors linearly combined with respective combination coefficients, and wherein the initial uniform vector is composed of said combination coefficients.

4. The method of claim 3, wherein said further uniform random vectors are fixed prior to being combined.

5. The method of claim 1, wherein the facies geostatistical model is also a function of a training image.

6. A computer-based method of history matching a facies geostatistical model of a hydrocarbon reservoir based on uniform random vectors, the method comprising:
creating an ensemble of initial realizations of a facies geostatistical model in which each one of the initial realizations is a function of at least one of a plurality of uniform random vectors, the model being a discontinuous multipoint simulation model;
fixing the plurality of uniform random vectors and then linearly combining the plurality of uniform random vectors with respective combination coefficients;
each realization thereby being associated with a uniform vector comprising the respective combination coefficients, whereby an ensemble of initial uniform combination coefficient vectors is provided;
deriving simulated dynamic responses from each initial realization for a given time period;
performing a Gaussian score transform on each initial uniform combination coefficient vector to create an initial Gaussian random vector that includes an ensemble of initial Gaussian combination coefficient vectors;
deriving a correlation matrix correlating each one of the Gaussian combination coefficient vectors and the simulated dynamic responses, and correlating said dynamic responses with each other;
obtaining measured data from a reservoir for the given time period;
using the correlation matrix, applying ensemble Kalman filter, using a computing processor, to the ensemble of initial Gaussian combination coefficient vectors to update the Gaussian combination coefficient vectors to the measured data, thereby creating updated Gaussian vectors;
computing updated uniform vectors corresponding to the updated Gaussian vectors;
deriving from the updated uniform vectors an updated ensemble of realizations; and
generating a channel probability map based on the updated ensemble of realizations, wherein,
the method preserves statistical data and geological features of the model.

7. The method of claim 6, wherein said model is also a function of a training image.

8. The method of claim 6, wherein each one of the initial realizations is directly based on one of the initial uniform random vectors.

9. The method of claim 6, wherein each one of the initial realizations is a function of a plurality of further uniform random vectors linearly combined with respective combination coefficients, and wherein the initial uniform vector is composed of said combination coefficients.

10. The method of claim 9, wherein said further uniform random vectors are fixed prior to being combined.

11. The method of claim 6, wherein the facies geostatistical model is also a function of a training image.

* * * * *